United States Patent
Hoshino et al.

(10) Patent No.: US 7,920,889 B2
(45) Date of Patent: Apr. 5, 2011

(54) TRANSMITTING APPARATUS, RECEIVING APPARATUS AND TRANSMISSION POWER CONTROL METHOD

(75) Inventors: Masayuki Hoshino, Kanagawa (JP); Ryohei Kimura, Kanagawa (JP); Yasuaki Yuda, Kanagawa (JP); Tomohiro Imai, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 721 days.

(21) Appl. No.: 11/915,724

(22) PCT Filed: May 30, 2006

(86) PCT No.: PCT/JP2006/310778
§ 371 (c)(1),
(2), (4) Date: Feb. 14, 2008

(87) PCT Pub. No.: WO2006/129661
PCT Pub. Date: Dec. 7, 2006

(65) Prior Publication Data
US 2009/0227211 A1 Sep. 10, 2009

(30) Foreign Application Priority Data
Jun. 1, 2005 (JP) ................................ 2005-161089

(51) Int. Cl.
*H04B 7/00* (2006.01)
*H04B 1/04* (2006.01)

(52) U.S. Cl. ....... 455/522; 455/127.1; 455/69; 370/252; 370/318; 370/437

(58) Field of Classification Search ............... 455/127.1, 455/422.1, 452.2, 522, 436, 450, 452.1, 67.11, 455/442, 69; 370/329, 311, 252, 320, 331, 332, 335, 342, 318, 334, 437
See application file for complete search history.

(56) References Cited

U.S. PATENT DOCUMENTS
7,020,110 B2 * 3/2006 Walton et al. ................. 370/334
(Continued)

FOREIGN PATENT DOCUMENTS
JP 11154927 6/1999
(Continued)

OTHER PUBLICATIONS
International Search Report dated Aug. 29, 2006.

*Primary Examiner* — Sujatha Sharma
(74) *Attorney, Agent, or Firm* — Dickinson Wright PLLC

(57) ABSTRACT

A transmitting apparatus, a receiving apparatus and a transmission power control method wherein even in a case of performing a transmission power control of multi-valued modulated symbols, the degradation of reception characteristic and that of network usage efficiency can be avoided. A power control instructing part (204) adjusts, based on an encoding rate and a modulation scheme in a case of applying a power control value, which maximizes the MIMO channel capacity, to each stream, the power control value of a stream, which is the most likely to be affected by a power estimation error, into a reference value, and then applies the adjustment value used for that adjustment to the other streams, that is, the streams that are not likely to be affected by the power estimation error. A power control part (205) performs a transmission power control in accordance with the power control value as adjusted by the power control instructing part (204).

10 Claims, 9 Drawing Sheets

U.S. PATENT DOCUMENTS

| | | | |
|---|---|---|---|
| 7,702,029 B2 * | 4/2010 | Kotecha et al. | 375/267 |
| 2004/0121827 A1 | 6/2004 | Murakami | |
| 2005/0208961 A1 * | 9/2005 | Willenegger | 455/522 |
| 2006/0239334 A1 * | 10/2006 | Kwon et al. | 375/132 |
| 2006/0262754 A1 * | 11/2006 | Andersson et al. | 370/332 |
| 2007/0242766 A1 * | 10/2007 | Xu et al. | 375/260 |
| 2008/0026711 A1 * | 1/2008 | Kim et al. | 455/127.5 |

FOREIGN PATENT DOCUMENTS

| | | |
|---|---|---|
| JP | 2003078461 | 3/2003 |
| JP | 2004194262 | 7/2004 |
| JP | 2004248075 | 9/2004 |
| JP | 2004254285 | 9/2004 |
| WO | 03071711 | 8/2003 |

* cited by examiner

| MCS FOR STREAM 1 | MCS FOR STREAM 2 | STREAM THAT IS MOST SUSCEPTIBLE TO INFLUENCE OF POWER ESTIMATION ERROR |
|---|---|---|
| QPSK, R=1/2 | 16QAM, R=1/2 | STREAM 2 |
| 64QAM, R=3/4 | 16QAM, R=3/4 | STREAM 1 |
| QPSK, R=1/3 | QPSK, R=1/2 | STREAM 2 |
| 16QAM, R=3/4 | 16QAM, R=1/2 | STREAM 1 |

| STREAM # | MCS | ESTIMATION ERROR INFLUENCE LEVEL ACCORDING TO MODULATION SCHEME | ESTIMATION ERROR INFLUENCE LEVEL ACCORDING TO CODING RATE | SUM TOTAL OF ESTIMATION ERROR INFLUENCE LEVEL |
|---|---|---|---|---|
| STREAM 1 | 16QAM, R=1/2 | 2 | 1 | 3 |
| STREAM 2 | 16QAM, R=3/4 | 2 | 1.5 | 3.5 |
| STREAM 3 | QPSK, R=1/2 | 1 | 1 | 2 |
| STREAM 4 | QPSK, R=1/3 | 1 | 0.66 | 1.66 |

FIG.7

TRANSMITTING APPARATUS, RECEIVING APPARATUS AND TRANSMISSION POWER CONTROL METHOD

TECHNICAL FIELD

The present invention relates to a transmitting apparatus, receiving apparatus and transmission power control method used in a wireless communication system utilizing a MIMO (Multiple-Input Multiple-Output) technique for receiving radio signals transmitted from a plurality of antenna elements at a plurality of antenna elements and carrying out wireless communication.

BACKGROUND ART

The technique of providing a plurality of antennas both on the transmitting side and on the receiving side, preparing a plurality of radio wave channels in space between the radio transmitting side and the radio receiving side and transmitting space-multiplexed signals through channels is known as "MIMO", and it is possible to improve transmission efficiency according to MIMO.

There is a link adaptation technique as a peripheral technique of MIMO. Link adaptation refers to a technique of adaptively controlling the M-ary modulation number (transmission rate), coding rate and transmission power distribution, according to changes in the channel environment between the transmitting side and the receiving side.

When link adaptation is applied to MIMO, it is possible to effectively utilize MIMO channels by distributing power to streams (transmitting antennas and beams for which data is assigned). Further, in a good quality environment, it is possible to realize high frequency use efficiency using M-ary modulation such as 16 QAM and 64 QAM.

On the other hand, generally, a common pilot is transmitted at a constant power all the time by applying link adaptation or taking into account monitoring with respect to other cell for handover.

The wireless communication apparatus disclosed in Patent Document 1 is known using such a technique. This communication apparatus will be briefly described On the receiving side, transmission power assigned for the streams is estimated based on channel estimation values and estimated transmission power is reported to the transmitting side using feedback signals. On the transmitting side, transmission power is assigned based on the feedback signals. Here, channel capacity can be maximized by setting (power distribution) transmission power according to the propagation condition of each stream.

Patent Document 1: Japanese Patent Application Laid-Open No. 2003-078461

DISCLOSURE OF INVENTION

Problems to be Solved by the Invention

However, with the technique disclosed in above Patent Document 1, assuming M-ary modulation symbol transmission, the common pilot channel is transmitted at constant transmission power, the data portion is controlled at transmission power according to power distribution, and so it is necessary to calculate a decision axis. If the accuracy of transmission power estimation on the receiving side is poor, reception characteristics significantly deteriorate, and, if transmission power is reported from the transmitting side to the receiving side using signaling or reference signals, channel use efficiency decreases.

It is an object of the present invention to provide a transmitting apparatus, receiving apparatus and transmission power control method which prevent reception characteristics deterioration and channel use efficiency decrease even when transmission power of M-ary modulation symbols are controlled.

Means for Solving the Problem

The transmitting apparatus according to the present invention employs a configuration including: an adjusting section that obtains feedback information including power control values for streams, adjusts a power control value for a stream that is the most sensitive to an influence of power estimation error, to a predetermined reference value and adjusts power control values for other streams using an adjustment value representing a difference between the power control value before the adjustment and the reference value; and a controlling section that controls transmission power of each stream according to the adjusted power control values.

ADVANTAGEOUS EFFECT OF THE INVENTION

The present invention makes it possible to prevent reception characteristics deterioration and channel use efficiency decrease even when transmission power of M-ary modulation symbols are controlled.

BRIEF DESCRIPTION OF DRAWINGS

FIG. 7 illustrates processing of replacing a power control value with a specifying value based on an estimation error influence level;

BEST MODE FOR CARRYING OUT THE INVENTION

Figure 1:
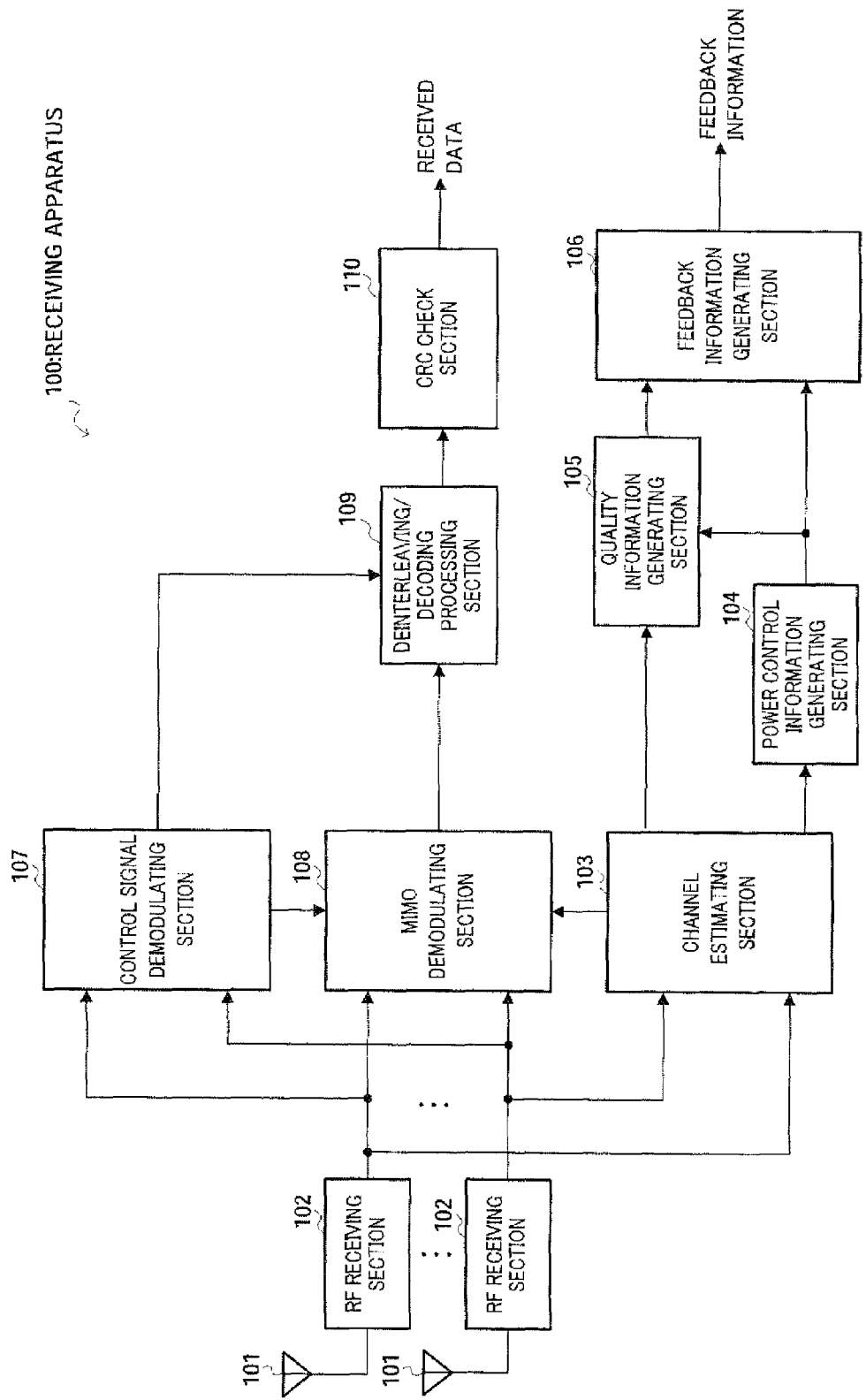
FIG. 1 is a block diagram showing a configuration of the receiving apparatus according to Embodiment 1 of the present invention.

Embodiments of the present invention will be described in detail with reference to the accompanying drawings. Here, configurations having the same functions will be assigned the same reference numerals and overlapping description will be omitted.

Embodiment 1

FIG. 1 is a block diagram showing a configuration of receiving apparatus 100 according to Embodiment 1 of the present invention. In this figure, RF receiving sections 102 convert carrier signals of radio frequency received from the transmitting apparatus through antennas 101 into baseband signals, and output the converted baseband signals to channel estimating section 103, control signal demodulating section 107 and MIMO demodulating section 108.

Channel estimating section 103 demodulates the common pilot signal from the baseband signals outputted from RF receiving sections 102, calculates the channel estimation values for all combinations of transmitting antennas and receiving antennas using the demodulated common pilot signal, rearranges the calculated channel estimation values according to the corresponding transmitting antennas and receiving antennas and obtains a channel matrix. The obtained channel matrix is outputted to power control information generating section 104, quality information generating section 105 and MIMO demodulating section 108.

Power control information generating section 104 calculates the power control value that maximizes MIMO channel capacity under a predetermined condition using a determinant of the channel matrix outputted from channel estimating section 103, and outputs the calculated power control value to quality information generating section 105 and feedback information generating section 106. The power control value calculated here will be found by employing known equation 1 shown below.

(Equation 1)

$$C_{prop} = \log_2 \det\left[I_{nR} + \frac{1}{\sigma_N^2} HPH^t\right], \quad [1]$$

$$\sum_{k=1}^{nr} p_k \le p_r, \; P: \text{Diagonal}(p_1, p_2, \ldots, p_{nr})$$

Here, H is a channel matrix, $\sigma_N^2$ is noise power, $I_{nR}$ is a identity matrix having dimensions corresponding to the number of receiving antennas and P is a diagonal matrix having power $p_k$ assigned to transmitting antennas as component. Above equation 1 determines power $p_k$ (power control value) assigned to each transmitting antenna (stream) such that $C_{prop}$ maximizes under the condition where total transmission power becomes constant $((p_1+p_2+ \ldots +p_{nr}) \le p_r)$.

Quality information generating section 105 finds received quality of each stream (SINR: Signal to Interference and Noise Ratio) using the channel matrix outputted from channel estimating section 103 in case the power control value outputted from power control information generating section 104 is applied. Then, quality information generating section 105 determines an applicable modulation scheme and coding rate based on the SINR and reports the determined modulation scheme and coding rate to feedback information generating section 106.

Feedback information generating section 106 generates feedback information indicating the power control value outputted from power control information generating section 104 and the modulation scheme and coding rate reported from quality information generating section 105, and transmits the generated feedback information to the transmitting apparatus.

Control signal demodulating section 107 demodulates modulation information, MIMO multiplex information and coding information from the baseband signals outputted from RF receiving sections 102, and outputs the demodulated modulation information and MIMO multiplex information to MIMO demodulating section 108 and the coding information to deinterleaving/decoding processing section 109.

MIMO demodulating section 108 MIMO demodulates the baseband signals outputted from RF receiving sections 102 using the channel matrix outputted from channel estimating section 103 and the modulation information and MIMO multiplex information outputted from control signal demodulating section 107, and outputs a soft decision value obtained as a demodulation result, to deinterleaving/decoding processing section 109.

Deinterleaving/decoding processing section 109 deinterleaves the soft decision value outputted from MIMO demodulating section 108 based on the coding information outputted from control signal demodulating section 107 and decodes the deinterleaved signal corresponding to the coding scheme. The signal obtained as a decoding result is outputted to CRC check section 110.

CRC check section 110 CRC checks the decoding result outputted from deinterleaving/decoding processing section 109 and decides whether or not there is error. When it is confirmed as the check result that there is no error, received data is extracted. Decision as to whether or not there is error is reported to the transmitting apparatus as a reception acknowledgement.

Figure 2:
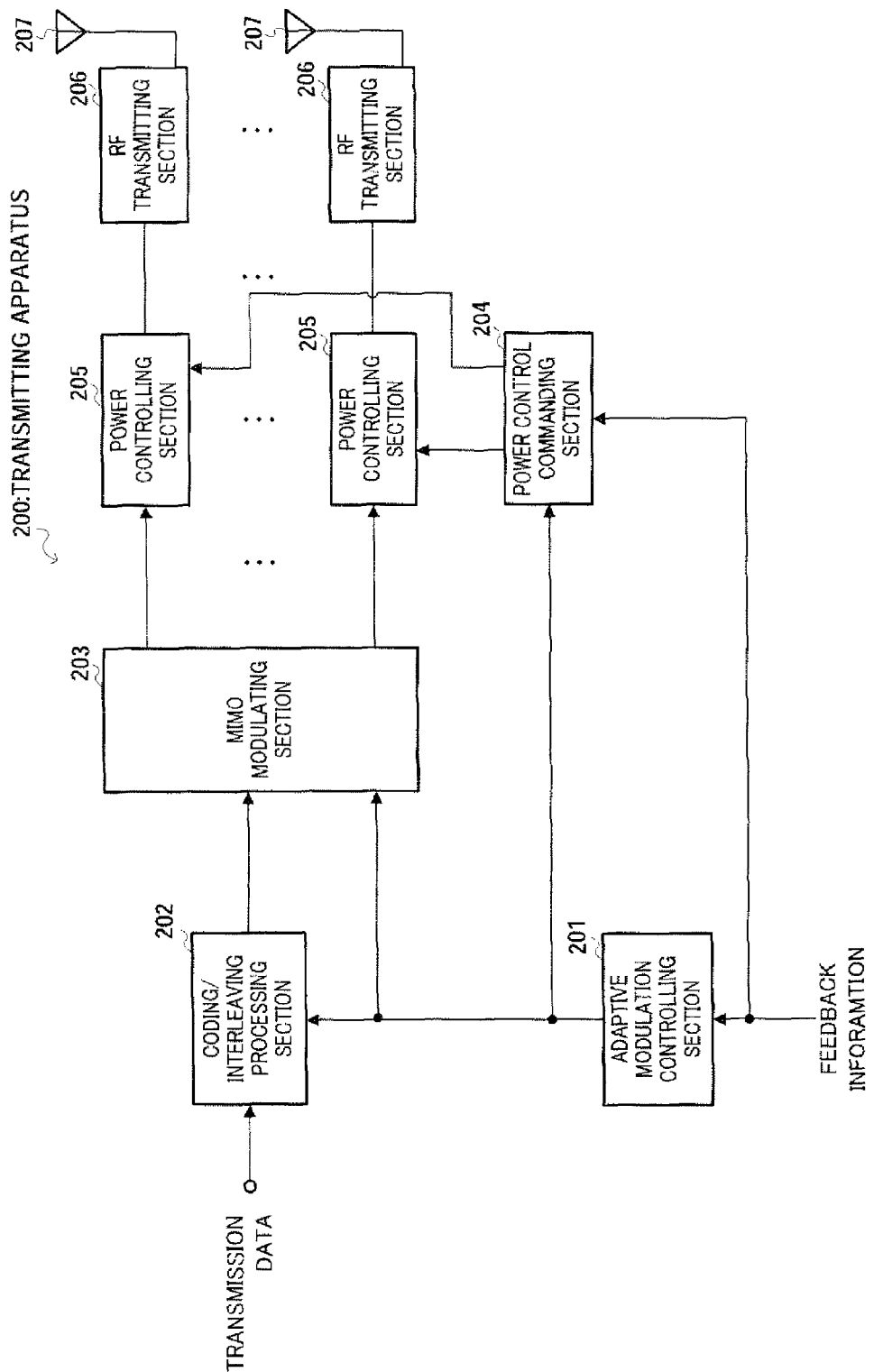
FIG. 2 is a block diagram showing a configuration of the transmitting apparatus according to Embodiment 1 of the present invention.

FIG. 2 is a block diagram showing a configuration of transmitting apparatus 200 according to Embodiment 1 of the present invention. In this figure, adaptive modulation controlling section 201 receives feedback information transmitted from receiving apparatus 100, outputs the coding information out of the received feedback information, to coding/interleaving processing section 202, and outputs the modulation information and MIMO multiplex information to MIMO modulating section 203 and power control commanding section 204.

Coding/interleaving processing section processing section 202 encodes and interleaves transmission data based on the coding information outputted from adaptive modulation controlling section 201 and outputs the transmission data subjected to coding and interleaving to MIMO modulating section 203.

MIMO modulating section 203 MIMO modulates the transmission data outputted from coding/interleaving processing section 202 based on the modulation information and MIMO multiplex information outputted from adaptive modulation controlling section 201, and outputs MIMO modulated signals to corresponding power controlling sections 205 provided with antennas 207.

Power control commanding section 204, which is an adjusting means, receives the feedback information transmitted from receiving apparatus 100, extracts the power control values for the streams from the received feedback information and obtains the modulation information and MIMO multiplex information from adaptive modulation controlling section 201. Power control commanding section 204 focuses on the stream that is the most sensitive to the influence of power estimation error based on the obtained modulation information and MIMO multiplex information and adjusts the power control value for this stream, to 0 dB (reference value). Power control commanding section 204 applies to other streams the difference between the power control value for this stream before adjustment and the power control value for this stream after adjustment as an adjustment value such that the differences between power control values for the streams before and after adjustment become the same. Power control commanding section 204 commands the power control values for the streams adjusted in this way, to power controlling section 205.

Power controlling commanding section 205 controls the power of MIMO modulated signals outputted from MIMO modulating section 203 according to commands from power control commanding section 204. The power-controlled signals are up-converted to carrier signals of radio frequency in RF transmitting sections 206 and transmitted through antennas 207.

Figure 3:
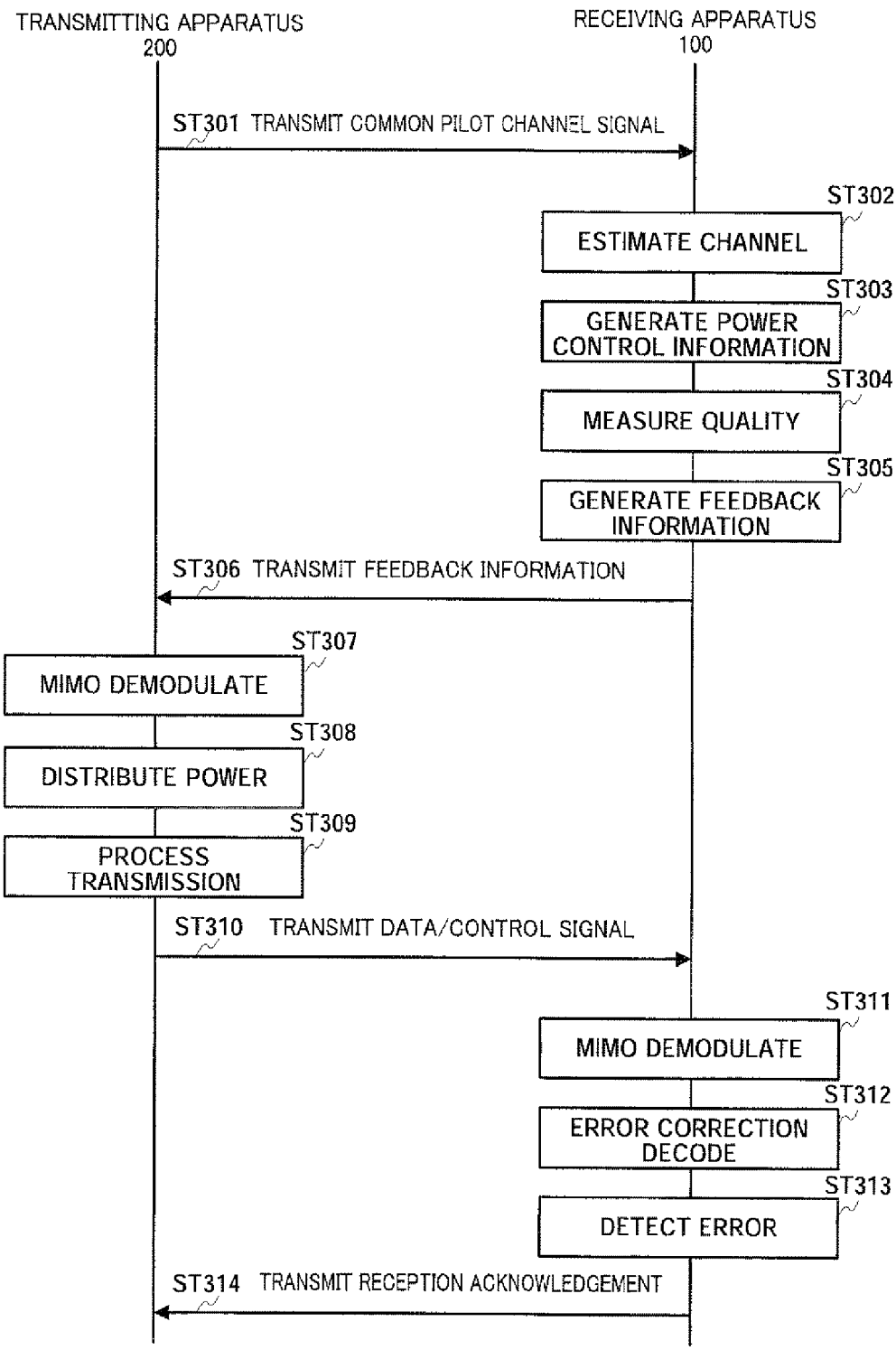
FIG. 3 is a sequence diagram showing operations of the receiving apparatus shown in FIG. 1 and the transmitting apparatus shown in FIG. 2.

Next, operations of above receiving apparatus 100 and transmitting apparatus 200 will be described with reference to FIG. 3. In FIG. 3, in step (hereinafter, abbreviated as "ST") 301, transmitting apparatus 200 transmits the common pilot channel signal to receiving apparatus 100.

In ST302, channel estimating section 103 of receiving section 100 carries out channel estimation based on the common pilot channel signal transmitted from transmitting apparatus 200, and finds a channel matrix.

In ST303, power control information generating section 104 of receiving apparatus 100 calculates the power control value that maximizes MIMO channel capacity under a predetermined condition using the channel matrix found in ST302.

In ST304, quality information generating section 105 finds the SINR as received quality of each stream in case the power control value calculated in ST303 is applied, and determines an applicable modulation scheme and coding rate based on the SINR.

In ST305, feedback information generating section 106 generates feedback information representing the power control value found in ST303 and the modulation scheme and coding rate determined in ST304 and transmits the feedback information generated in ST305 to transmitting apparatus 200.

In ST307, MIMO modulating section 203 of transmitting apparatus 200 MIMO modulates transmission data based on the modulation information and MIMO multiplex information included in the feedback information.

In ST308, power control commanding section 204 focuses on the stream that is the most sensitive to the influence of power estimation error based on the modulation information and MIMO multiplex information included in the feedback information and the power control value, and adjusts the power control value for this stream to "0." Further, this adjustment value is applied to other streams.

Figures 4, 5:
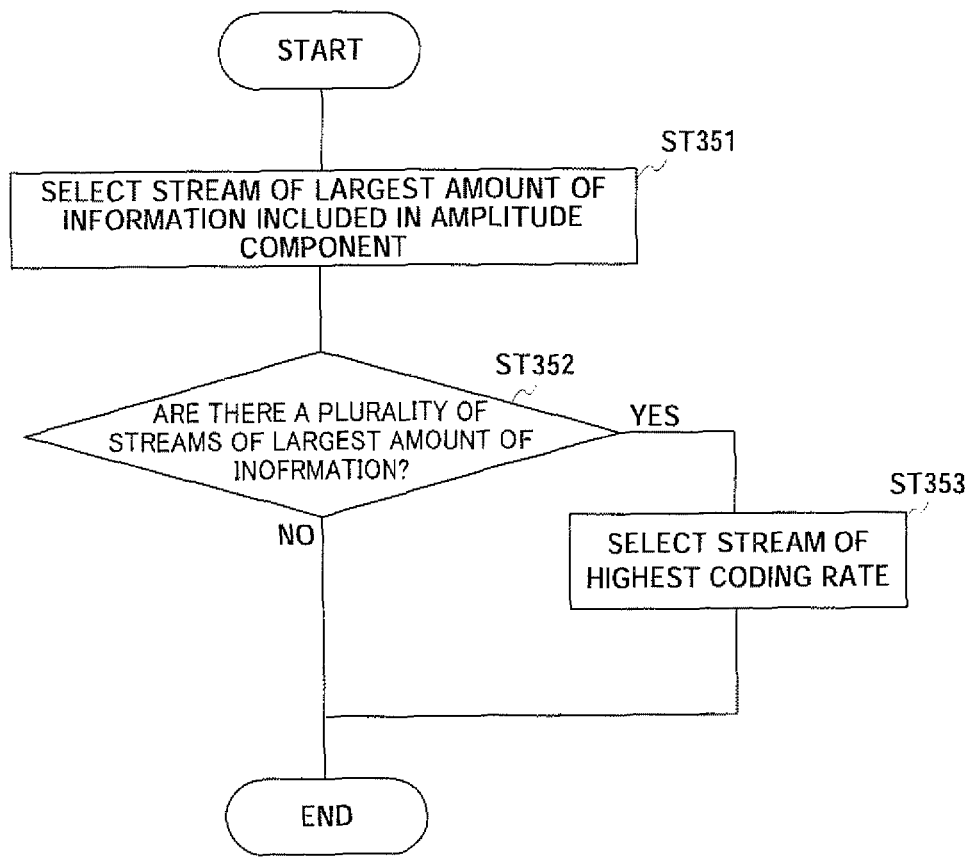
FIG. 4 is a flowchart showing a method of determining a stream that is the most sensitive to the influence of power estimation error.
FIG. 5 illustrates a method of determining the stream that is the most sensitive to the influence of power estimation error.

Here, the method of determining in power control commanding section 204 the stream that is the most sensitive to the influence of power estimation error will be described with reference to FIG. 4. In ST351 of FIG. 4, the amount of information included in amplitude component is compared between the modulation schemes of each stream and the stream which includes the largest amount of information is selected.

In ST352, whether or not a plurality of streams having the largest amount of information are selected in ST351, is decided. When a plurality of streams are selected ("YES"), the flow proceeds to ST353, and, when a plurality of streams are not selected ("NO"), the stream selected in ST351 is determined as the stream that is the most sensitive to the influence of power estimation error.

In ST353, the coding rates of the streams selected in ST352 are compared, and the stream of the highest coding rate is selected and the selected stream is determined as the stream that is the most sensitive to the influence of power estimation error.

Next, the method shown in FIG. 4 will be described in detail using a case of two streams as an example. FIG. 5 is a table tabulating modulation schemes and coding rates of streams (MCS: Modulation and Coding Scheme) and the streams that are the most sensitive to the influence of power estimation error. As shown in FIG. 5, when the MCS is QPSK and coding rate ("R")=½ for stream 1 and the MCS is 16 QAM and R=½ for stream 2, minimum distance between QPSK symbols is greater than that for 16 QAM, provides no amplitude component, and is therefore less sensitive to the influence of power estimation error. Accordingly, stream 2 to which 16 QAM is applied is determined as the stream that is the most sensitive to the influence of power estimation error.

Further, when the MCS is 64 QAM and R=¾ for stream 1 and the MCS is 16 QAM and R=¾ for stream 2, 16 QAM has greater distance between modulated symbols than 64 QAM and is therefore less sensitive to the influence of power estimation error. Accordingly, stream 1 to which 64 QAM is applied is determined as the stream that is the most sensitive to the influence of power estimation error.

Further, when the MCS is QPSK and R=⅓ for stream 1 and the MCS is QPSK and R=½ for stream 2, the influence of deterioration factors including estimation error becomes greater when coding rates (closer to 1) are lower. Accordingly, stream 2 to which R=½ is applied is determined as the stream that is the most sensitive to the influence of power estimation error.

Similarly, when the MCS is 16 QAM and R=¾ for stream 1 and the MCS is 16 QAM and R=½ for stream 2, stream 1 to which R=¾ is applied is determined as the stream that is the most sensitive to the influence of power estimation error.

Next, the method of power control value adjustment will be described in detail using a case as an example where the MCS is QPSK and R=½ for stream 1 and the MCS is 16 QAM and R=½ for stream 2. Power control commanding section 204 rearranges the streams in order from the largest influence of power estimation error based on the table shown in FIG. 5, and ranks stream 2 and stream 1 in order.

Then, the power control value for each stream is obtained. Here, the power control value for stream 1 is −1 dB and the power control value for stream 2 is +1 dB. The stream that is the most sensitive to the influence of power estimation error is stream 2 and so power control value +1 dB of stream 2 is adjusted to 0 dB. Here, the adjustment value is −1 dB and so if this adjustment value is applied to the other stream, that is, stream 1, the power control value for stream 1 becomes −2 dB.

Referring back to FIG. 3, in ST309, according to the power control value adjusted in ST308, transmission processing such as power control of signals MIMO modulated in ST307 and RF transmission processing are carried out in power controlling sections 205 and RF transmitting sections 206, sequentially.

In ST310, the data subjected to transmission processing in ST309 is transmitted to receiving apparatus 100 and a control signal including modulation information, MIMO multiplex information and coding information is transmitted to receiving apparatus 100.

In ST311, MIMO demodulating section 108 of receiving apparatus 100 MIMO demodulates data based on the control signal. In ST312, deinterleaving/decoding processing section 109 performs error correction decoding on the MIMO demodulated data. In ST313, the data after the error correction decoding is subjected to CRC check in CRC check section 110. In ST314, CRC check section 110 transmits a reception acknowledgement indicating whether or not there is error, to transmitting apparatus 200.

In this way, according to Embodiment 1, a power control value that maximizes MIMO channel capacity is calculated per stream, the power control value for the stream that is the most sensitive to the influence of power estimation error is adjusted to a reference value based on a modulation scheme and coding rate in case the calculated power control value is applied and an adjustment value required for this adjustment is applied to the other stream, that is, a stream which is less sensitive to the influence of power estimation error, so that it is possible to carry out demodulation by keeping received quality without estimating the power control value on the receiving side and carry out power distribution.

Embodiment 2

Figure 6:
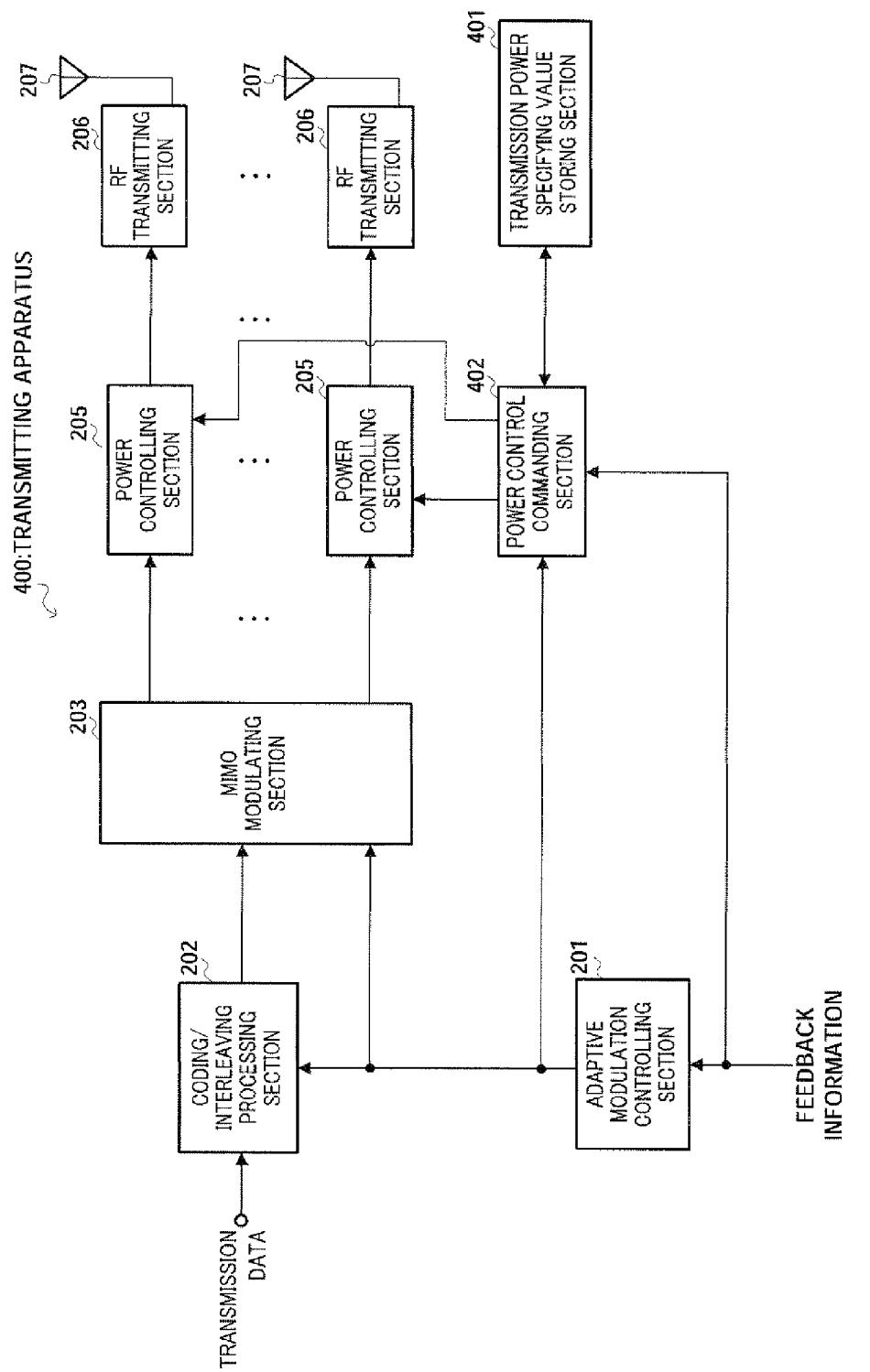
FIG. 6 is a block diagram showing a configuration of a transmitting apparatus according to Embodiment 2 of the present invention.

FIG. 6 is a block diagram showing a configuration of transmitting apparatus 400 according to Embodiment 2 of the present invention. In this figure, transmission power specifying value storing section 401 stores the same power control value as for the common pilot channel or the value obtained by multiplying the power control value by the reciprocal of the number of streams, as transmission power specifying values.

Power control commanding section 402 adjusts the power control value for the stream that is the most sensitive to the influence of power estimation error, to 0 dB, and applies this adjustment value to the other streams. Further, when a plurality of MCS's are divided into levels, for example, level 1, level 2 . . . (referred to as "estimation error influence levels") in order from the MCS least sensitive to the influence of power estimation error and there is the stream more than a given level, having adjusted power control value other than 0 dB, power control commanding section 402 replaces the adjusted power control value for the stream with a specifying value closest to the adjusted power control value for the stream, out of specifying values stored in transmission power specifying value storing section 401.

Next, processing of replacing the power control value with a specifying value based on an estimation error influence level will be described in detail with reference to FIG. 7 and FIG. 5 using a case of four streams as an example. Here, the estimation error influence level (hereinafter, referred to as "specifying value application level") to which a transmission power specifying value is applicable is level 3.

FIG. 7 shows a correspondence table where the estimation error influence levels according to modulation schemes are 2 for 16 QAM and 1 for QPSK, and the estimation error influence level according to coding rates are set twice the coding rate.

Figure 8:
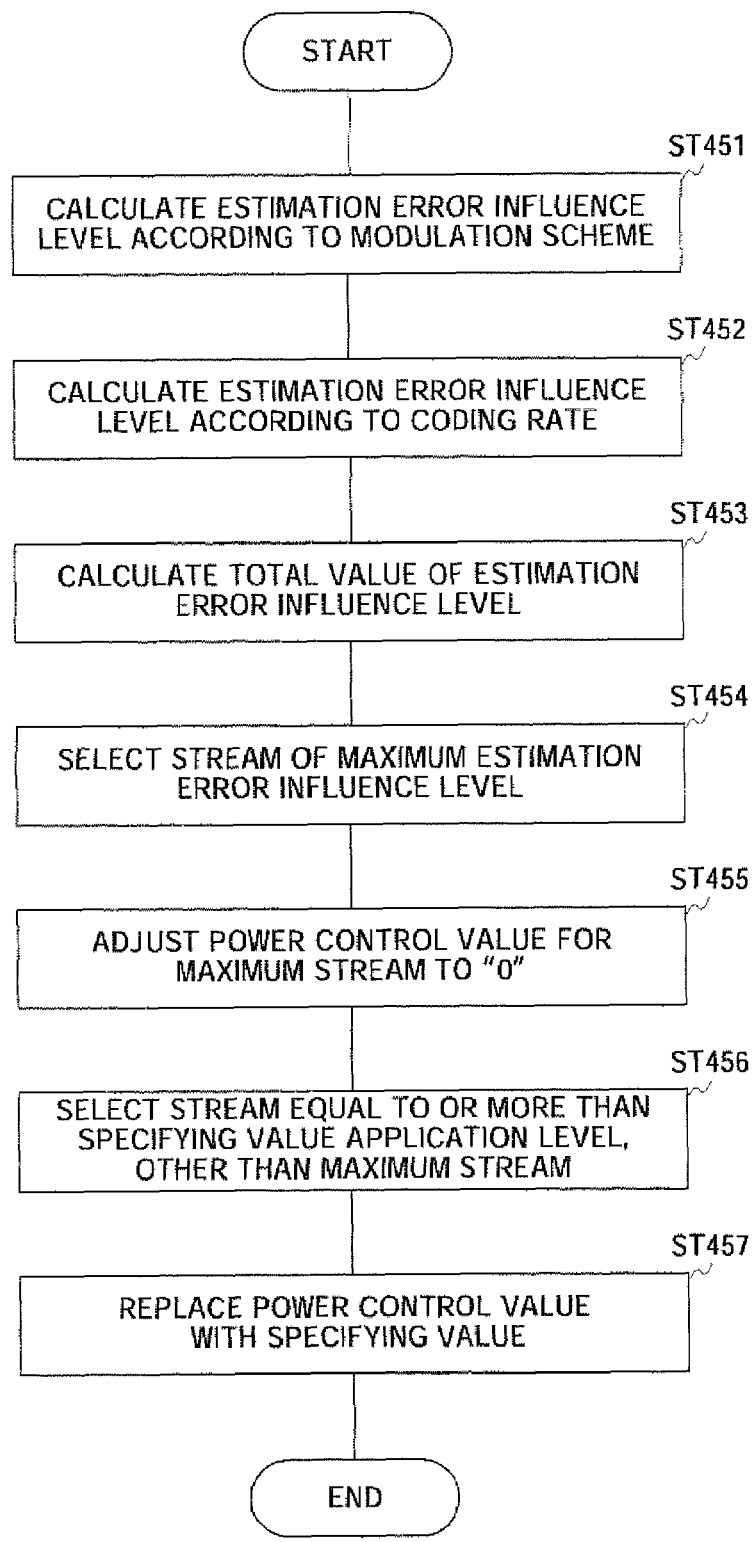
FIG. 8 is a flowchart showing processing of replacing a power control value with a specifying value based on an estimation error influence level.

In FIG. 8, in ST451, the estimation error influence level according to the modulation scheme is calculated for each stream and, in ST452, the estimation error influence level according to the coding rate is calculated for each stream. Further, in ST453, by adding the estimation error level according to the modulation scheme calculated in ST451 and the estimation error influence level according to the coding rate calculated in ST452, a total value of estimation error influence levels is found and the table shown in FIG. 7 is generated.

In ST454, the stream that maximizes the estimation error influence level is selected based on the total value of estimation error influence levels found in ST453, and stream 2 is selected from the table shown in FIG. 7. In ST455, the power control value for stream 2 selected in ST454 is adjusted to "0."

In ST456, a stream other than the stream having the maximum estimation error influence level is selected out of the streams having a total value of estimation error influence levels equal to or more than the specifying value application level (here, level 3), and stream 1 is selected from the table of FIG. 7.

In ST457, the power control value for stream 1 selected in ST456 is replaced with a specifying value stored in transmission power specifying value storing section 401.

Further, stream 3 and stream 4 have estimation error influence levels less than a threshold value, and so it is decided to carry out transmission power control at an arbitrary value and transmission power control applying the adjustment value is carried out.

In this way, according to Embodiment 2, when there is a stream sensitive to the influence of power estimation error, other than the stream that is the most sensitive to the influence of power estimation error, it is possible to reduce the amount of side information for reporting power control values from the transmitting apparatus to the receiving apparatus by using a transmission power specifying value determined in advance as the power controlling value.

Embodiment 3

Figure 9:
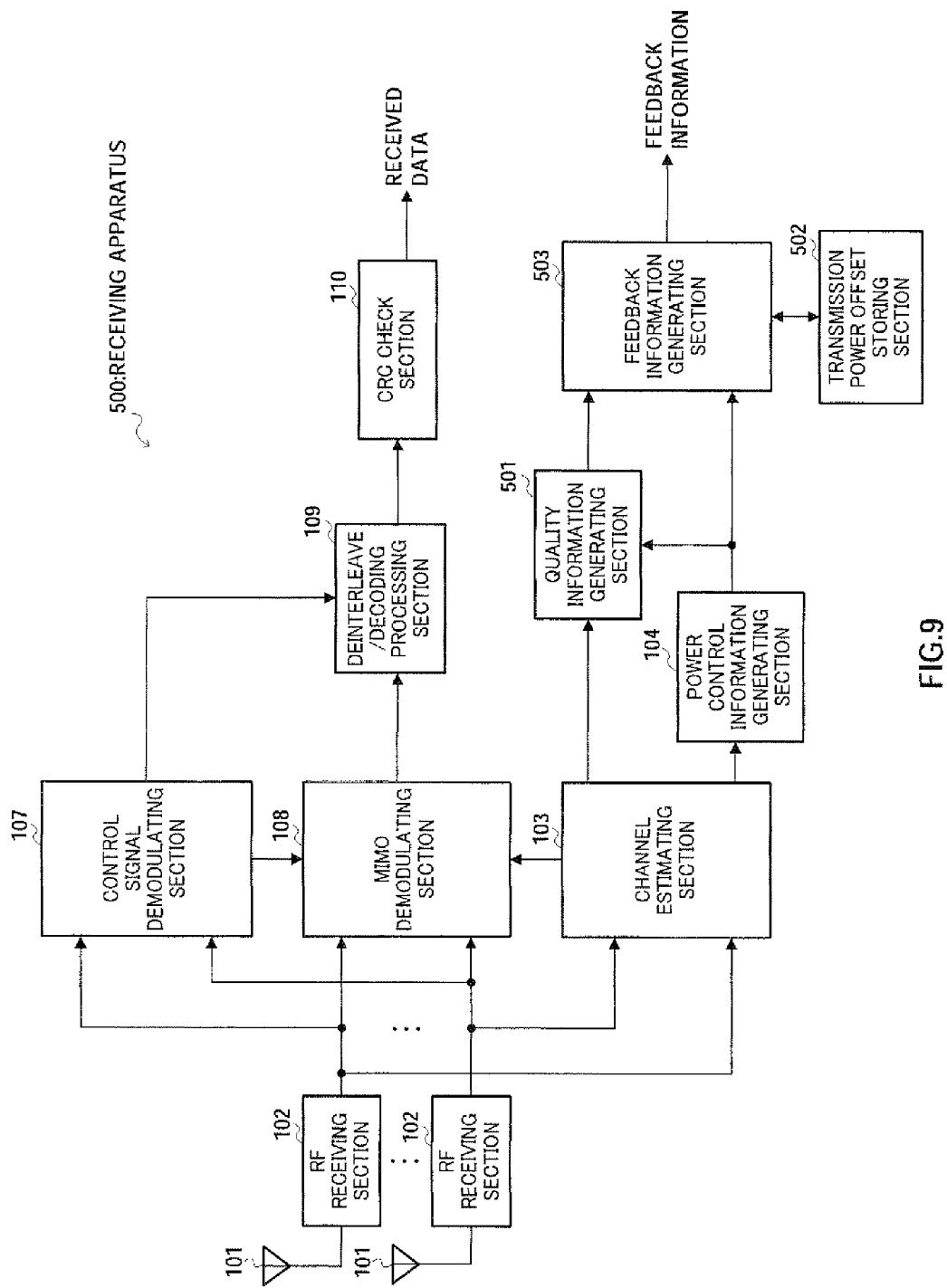
FIG. 9 is a block diagram showing a configuration of the receiving apparatus according to Embodiment 3 of the present invention.

FIG. 9 is a block diagram showing a configuration of receiving apparatus 500 according to Embodiment 3 of the present invention. In this figure, when the power control value outputted from power control information generating section 104 is applied, quality information generating section 501 finds the SINR of each stream using the channel matrix outputted from channel estimating section 103 and determines an applicable modulation scheme and coding rate based on the SINR. Further, quality information generating section 501 outputs the excess value of the power control value (hereinafter, simply referred to as "excess value") outputted from power control information generating section 104 with respect to transmission power which satisfies received quality required by the determined modulation scheme and coding rate, to feedback information generating section 503.

Transmission power offset storing section 502 stores transmission power offset values associated with the excess value.

When the excess value is outputted from quality information generating section 501, feedback information generating section 503 searches for the offset value associated with the excess value from transmission power offset storing section 502 and generates feedback information for subtracting the offset value from the transmission power of the corresponding stream.

Figure 10:
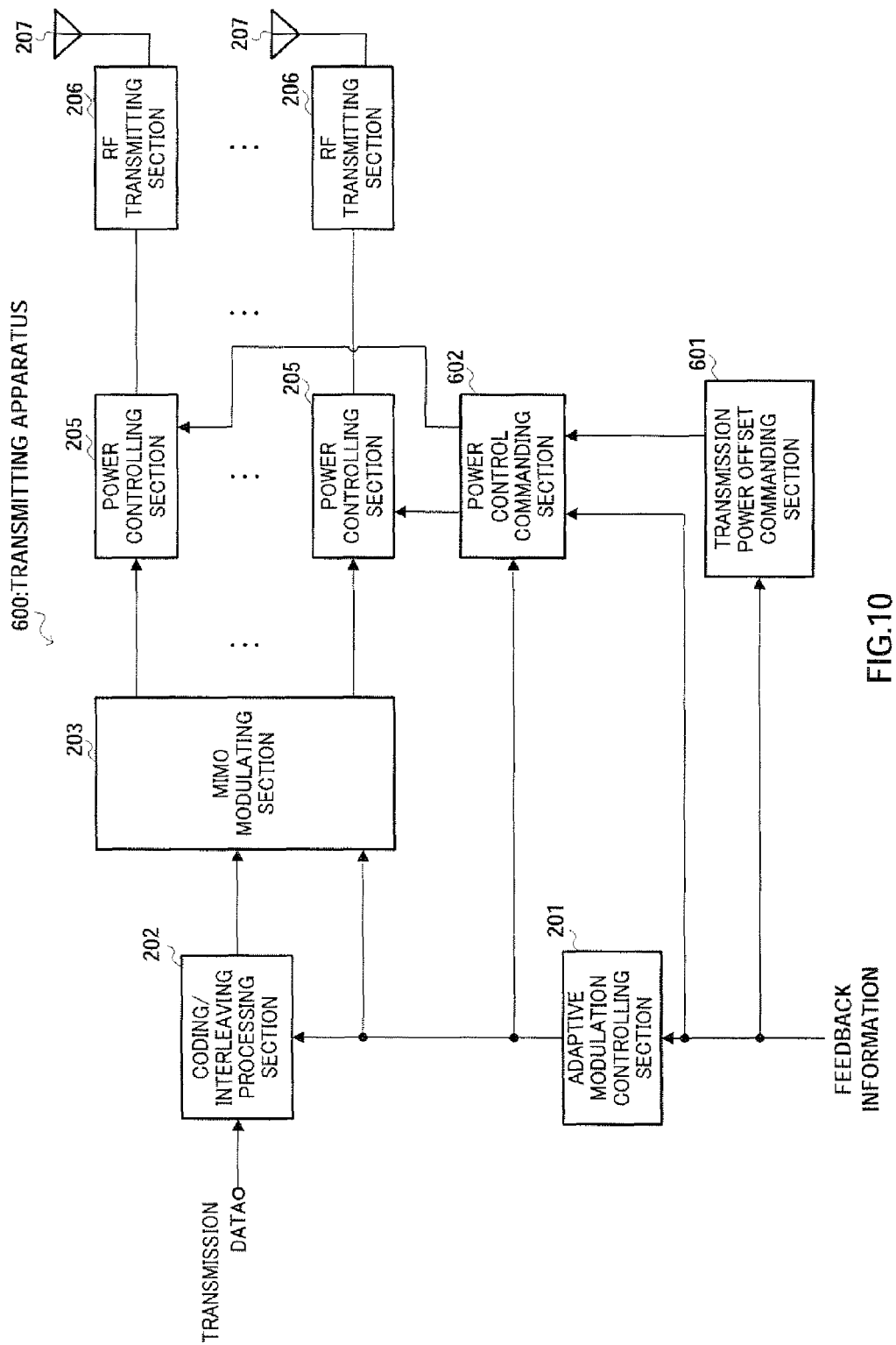
FIG. 10 is a block diagram showing a configuration of the transmitting apparatus according to Embodiment 3 of the present invention.

FIG. 10 is a block diagram showing a configuration of transmitting apparatus 600 according to Embodiment 3 of the present invention. In this figure, transmission power offset commanding section 601 receives the feedback information transmitted from receiving apparatus 500, extracts the transmission power offset value included in the received feedback information and outputs the extracted offset value to power control commanding section 602.

Power control commanding section 602 adjusts the power control value for the stream that is the most sensitive to the influence of power estimation error, to 0 dB. Then, power control commanding section 602 obtains the maximum offset value outputted from transmission power offset commanding section 601 and replaces the adjustment value with the value obtained by subtracting the maximum offset value from the adjustment value. Moreover, power control commanding section 602 applies the replaced adjustment value to all streams.

In this way, according to Embodiment 3, when there is a stream satisfying required received quality, for which excessive power is set, an adjustment value replaced with a value obtained by subtracting an offset value associated with the excess value from the adjustment value and the replaced adjustment value is applied to all streams, so that it is possible to reduce total transmission power and reduce the interference component for other cells.

Although cases have been described with the above embodiment as examples where the present invention is configured by hardware. However, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese patent application No. 2005-161089, filed on Jun. 1, 2005, the entire content of which is expressly incorporated by reference herein.

INDUSTRIAL APPLICABILITY

The transmitting apparatus, receiving apparatus and transmission power control method according to the present invention make it possible to prevent reception characteristics deterioration and channel use efficiency decrease even when transmission power of Mary modulation symbols are controlled and are useful for a MIMO transmitting apparatus and MIMO receiving apparatus.

The invention claimed is:

1. A transmitting apparatus comprising:
an adjusting section that obtains feedback information including power control values for streams, adjusts a power control value for a stream that is the most sensitive to an influence of power estimation error, to a predetermined reference value and adjusts power control values for other streams using an adjustment value representing a difference between the power control value before the adjustment and the reference value; and
a controlling section that controls transmission power of each stream according to the adjusted power control values.

2. The transmitting apparatus according to claim 1, wherein the adjusting section determines the stream that is the most sensitive to the influence of power estimation error based on modulation schemes and coding rates applied to the streams.

3. The transmitting apparatus according to claim 1, further comprising a storing section that stores a same power control value as for a common pilot channel signal or a value obtained by multiplying a power control value by a reciprocal of a number of streams, as a transmission power specifying value, wherein, when there is a stream sensitive to the influence of power estimation error, other than the stream that is the most sensitive to the influence of power estimation error, the adjusting section replaces a feed back power control value with the transmission power specifying value.

4. The transmitting apparatus according to claim 1, wherein, when there is a stream satisfying required received quality, for which an excessive power control value is set, the adjusting section replaces the adjustment value with a value obtained by subtracting an offset value associated with the excess value from the adjustment value and adjusts all streams using the replaced adjustment value.

5. A wireless communication base station apparatus comprising the transmitting apparatus according to claim 1.

6. A receiving apparatus comprising:
a channel estimating section that obtains a channel matrix by carrying out channel estimation using a common pilot channel signal;
a power control information generating section that calculates power control values for streams that maximize channel capacity under a predetermined condition using the channel matrix;
a quality Information generating section that finds received quality of each stream in case the power control values are applied to the streams using the channel matrix, and determines modulation schemes and coding rates applicable to each stream based on the calculated received quality; and
a feedback information generating section that transmits feedback information including the power control values, modulation schemes and coding rates to the transmitting apparatus according to claim 1.

7. A receiving apparatus comprising:
a channel estimating section that obtains a channel matrix by carrying out channel estimation using a common pilot channel signal;
a power control information generating section that calculates power control values for streams that maximize channel capacity under a predetermined condition using the channel matrix;
a quality information generating section that finds received quality of each stream in case the power control values are applied to the streams using the channel matrix and determines modulation schemes and coding rates applicable to each stream based on the received quality;
an offset storing section that stores an excess value associated with offset values; and
a feedback information generating section that transmits feedback information including the power control values, modulation schemes, coding rates and the offset values to the transmitting apparatus according to claim 4.

8. A wireless communication mobile station apparatus comprising the receiving apparatus according to claim 6.

9. A transmission power control method comprising:
in a receiving apparatus:
calculating power control values for streams that maximize channel capacity under a predetermined condition using a channel matrix;
finding received quality of each stream in case the power control values are applied to the streams using the channel matrix, and determining modulation schemes and coding rates applicable to each stream based on the received quality; and transmitting feedback information including the power control values, modulation schemes and coding rates to a transmitting apparatus, and in the transmitting apparatus:

obtaining feedback information including the power control values for the streams from the receiving apparatus, adjusting a power control value for a stream that is the most sensitive, to an influence of power estimation error and adjusting power control values for other streams using an adjustment value representing a difference between the power control value before the adjustment and a reference value; and controlling transmission power of the streams according to the adjusted power control values.

10. A wireless communication system comprising:

a receiving apparatus that comprises:

a channel estimating section that obtains a channel matrix by carrying out channel estimation using a common pilot channel signal;

a power control information generating section that calculates power control values for streams that maximize channel capacity under a predetermined condition using the channel matrix;

a quality information generating section that finds received quality of each stream in case the power control values are applied to the streams using the channel matrix, and determines modulation schemes and coding rates applicable to each stream based on the received quality; and a feedback information generating section that transmits feedback information including the power control values, modulation schemes and coding rates to a transmitting apparatus, and the transmitting apparatus comprises:

an adjusting section that obtains feedback information including the power control values for the streams from the receiving apparatus, adjusts a power control value for a stream that is the most sensitive to an influence of a power estimation error, to a reference value and adjusts power control values for other streams using an adjustment value representing a difference between the power control value before the adjustment and a reference value; and a controlling section that controls transmission power of the streams according to the adjusted power control values.

* * * * *